United States Patent
Ochi et al.

(10) Patent No.: US 11,173,695 B2
(45) Date of Patent: Nov. 16, 2021

(54) DECORATIVE FILM, METHOD FOR PRODUCING DECORATIVE FILM, METHOD FOR PRODUCING DECORATIVE FILM-ATTACHED THREE DIMENSIONAL MOLDED PRODUCT AND FLUORINATED POLYMER COMPOSITION

(71) Applicant: AGC Inc., Chiyoda-ku (JP)

(72) Inventors: Shuhei Ochi, Chiyoda-ku (JP); Tomoaki Gomi, Chiyoda-ku (JP); Shun Saito, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/905,966

(22) Filed: Jun. 19, 2020

(65) Prior Publication Data

US 2020/0316926 A1 Oct. 8, 2020

Related U.S. Application Data

(63) Continuation of application No. PCT/JP2018/046992, filed on Dec. 20, 2018.

(30) Foreign Application Priority Data

Dec. 20, 2017 (JP) .............................. JP2017-243772

(51) Int. Cl.
   *B32B 27/32* (2006.01)
   *B32B 7/12* (2006.01)
   *B32B 27/26* (2006.01)

(52) U.S. Cl.
   CPC .............. *B32B 27/322* (2013.01); *B32B 7/12* (2013.01); *B32B 27/26* (2013.01);
   (Continued)

(58) Field of Classification Search
   None
   See application file for complete search history.

(56) References Cited

U.S. PATENT DOCUMENTS

2016/0347042 A1* 12/2016 Walker, Jr. .............. B32B 27/20

FOREIGN PATENT DOCUMENTS

| EP | 0 416 501 | 3/1991 |
| EP | 2 626 394 | 8/2013 |

(Continued)

OTHER PUBLICATIONS

International Search Report dated Mar. 19, 2019 in PCT/JP2018/046992 filed on Dec. 20, 2018, 2 pages.

*Primary Examiner* — Ramsey Zacharia
(74) *Attorney, Agent, or Firm* — Oblon, McClelland, Maier & Neustadt, L.L.P.

(57) ABSTRACT

To provide a decorative film, whereby formation of wrinkles is suppressed when bonded to a three dimensional molded product in a stretched state, a method for producing a decorative film, a method for producing a decorative film-attached three dimensional molded product, and a fluorinated polymer composition. The decorative film of the present invention is a decorative film having at least a base film layer and a fluorinated layer containing a crosslinked fluorinated polymer, wherein the crosslinked fluorinated polymer is a crosslinked product of a crosslinkable polymer comprising units based on a fluoroolefin and units having a crosslinkable group, and the average molecular weight between crosslinking groups of the crosslinked fluorinated polymer is from 500 to 50,000.

9 Claims, 1 Drawing Sheet

(52) U.S. Cl.
CPC ..... *B32B 2305/72* (2013.01); *B32B 2307/718* (2013.01); *B32B 2451/00* (2013.01); *B32B 2605/003* (2013.01)

(56) References Cited

FOREIGN PATENT DOCUMENTS

| | | |
|---|---|---|
| EP | 3 219 769 | 9/2017 |
| EP | 3 533 845 | 9/2019 |
| JP | 2004-307666 A | 11/2004 |
| JP | 2005-162994 A | 6/2005 |
| JP | 2014-184726 A | 10/2014 |
| JP | 2016-048732 A | 4/2016 |
| WO | WO 2018/079775 A1 | 6/2018 |
| WO | WO 2018/168987 A1 | 9/2018 |

\* cited by examiner

DECORATIVE FILM, METHOD FOR PRODUCING DECORATIVE FILM, METHOD FOR PRODUCING DECORATIVE FILM-ATTACHED THREE DIMENSIONAL MOLDED PRODUCT AND FLUORINATED POLYMER COMPOSITION

TECHNICAL FIELD

The present invention relates to a decorative film, a method for producing a decorative film, a method for producing a decorative film-attached three dimensional molded product, and a fluorinated polymer composition.

BACKGROUND ART

On the surface of a three dimensional molded product to be used in the field of interior and exterior members of automobiles, there is a case where decoration by a decorative film is applied for the purpose of imparting a design property or for protection of the surface. In Patent Document 1, a decorative film having a fluorinated layer containing a polyvinylidene fluoride is disclosed.

PRIOR ART DOCUMENT

Patent Document

Patent Document 1: JP-A-2014-184726

DISCLOSURE OF INVENTION

Technical Problem

The above mentioned decorative film is, while being stretched or being in a stretched state, bonded to a three dimensional molded product. However, it has been found that when the decorative film having a fluorinated layer containing a polyvinylidene fluoride as described in Patent Document 1 was bonded to a three dimensional molded product, while being stretched or being in a stretched state, there was a case where wrinkles were formed in the decorative film.

In view of the above problem, it is an object of the present invention to provide a decorative film, whereby formation of wrinkles is suppressed when it is bonded to a three dimensional molded product while being stretched or being in a stretched state, a method for producing such a decorative film, a method for producing a decorative film-attached three dimensional molded product, and a fluorinated polymer composition.

Solution to Problem

The present inventors have made intensive studies on the above problem and as a result, they have found that in the fluorinated layer containing a fluorinated polymer, it is possible to obtain desired effects when the average molecular weight between crosslinking points of the fluorinated layer is within the predetermined range and thus have arrived at the present invention.

That is, the present inventors have found it possible to solve the above problem by the following constructions.

[1] A decorative film having a base film layer and a fluorinated layer containing a crosslinked fluorinated polymer, characterized in that the crosslinked fluorinated polymer is a crosslinked product of a crosslinkable polymer comprising units based on a fluoroolefin and units having a crosslinkable group, and the average molecular weight between crosslinking points of the crosslinked fluorinated polymer is from 500 to 50,000.

[2] The decorative film according to [1], wherein the ratio of the number average molecular weight of the crosslinkable polymer to the average molecular weight between crosslinking points of the crosslinked fluorinated polymer, is from 0.01 to 15.

[3] The decorative film according to [1] or [2], wherein the number average molecular weight of the crosslinkable polymer is from 3,000 to 30,000.

[4] The decorative film according to any one of [1] to [3], wherein the content of units having a crosslinkable group, to all units which the crosslinkable polymer comprises is from 3 to 30 mol %.

[5] The decorative film according to any one of [1] to [4], wherein the crosslinked fluorinated polymer is a crosslinked fluorinated polymer in which the crosslinkable polymer having a first crosslinkable group and a non-fluorinated compound having a second crosslinkable group, are co-crosslinked by a curing agent having at least two groups reactive to each of the first crosslinkable group and the second crosslinkable group.

[6] The decorative film according to any one of [1] to [5], which further has a bonding layer.

[7] The decorative film according to [6], wherein the decorative film has a structure in which the bonding layer, the fluorinated layer and the base film are arranged in this order, and the fluorinated layer and the base film are in contact.

[8] The decorative film according to [6], wherein the decorative film has a structure in which the bonding layer, the base film and the fluorinated layer are arranged in this order.

[9] The decorative film according to any one of [1] to [8], which is used to decorate a three dimensional molded product to be used as an automobile exterior member or an automobile interior member.

[10] A composition comprising a crosslinkable polymer comprising units based on a fluoroolefin and units having a first crosslinkable group, a non-fluorinated compound having a second crosslinkable group, and a curing agent having at least two groups reactive to each of the first crosslinkable group and the second crosslinkable group, characterized in that the number average molecular weight of the crosslinkable polymer is from 3,000 to 30,000, and the number average molecular weight of the non-fluorinated compound is from 500 to 30,000.

[11] The composition according to [10], wherein the first crosslinkable group and the second crosslinkable group are both hydroxy groups.

[12] The composition according to [11], wherein the hydroxy value of the crosslinkable polymer and the hydroxy value of the non-fluorinated compound are both from 10 to 150 mgKOH/g.

[13] A method for producing the decorative film as defined in any one of [1] to [9], which comprises forming the fluorinated layer by using the composition as defined in any one of [10] to [12].

[14] A method for producing a decorative film-attached three dimensional molded product, which comprises press-bonding under reduced pressure the decorative film as defined in any one of [1] to [9] and a surface to be decorated of a three dimensional molded product, to obtain a decorative film-attached three dimensional molded product having the fluorinated layer at the outermost surface.

Advantageous Effects of Invention

According to the present invention, it is possible to provide a decorative film, whereby formation of wrinkles is suppressed when it is bonded to a three dimensional molded product while being stretched or being in a stretched state, a method for producing such a decorative film, a method for producing a decorative film-attached three dimensional molded product, and a fluorinated polymer composition.

DESCRIPTION OF EMBODIMENTS

Figure 1:
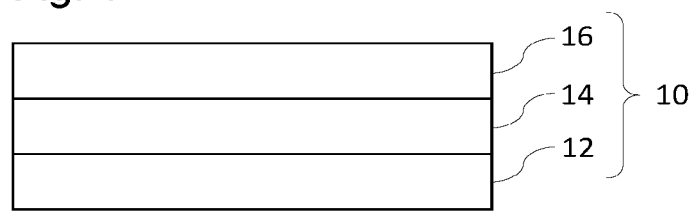
FIG. 1 is a schematic side view showing an example of a layer structure of the decorative film of the present invention.

Meanings of the terms in the present invention are as follows.

In the present specification, decorative means e.g. imparting a design property or protection of a surface, and a decorative film means a film to be used for decorating an object to be decorated.

A (meth)acrylate is a general term for an acrylate and a methacrylate, and (meth)acrylic is a general term for acrylic and methacrylic. Further, a (meth)acrylic resin means a resin made of a polymer composed mainly of units based on a (meth)acrylate.

A unit is a general term for an atomic group directly formed by polymerization of a monomer and based on one molecule of the monomer, and an atomic group obtained by chemically converting a portion of the atomic group. Here, the contents (mol %) of the respective units to all units which the polymer comprises, are obtainable by analyzing the polymer by a nuclear magnetic resonance spectra (NMR) method.

The acid value and the hydroxy value are, respectively, values which are measured in accordance with the methods of JIS K 0070-3 (1992).

The glass transition temperature is an intermediate point glass transition temperature of a polymer, which is measured by a differential scanning calorimetry (DSC) method. The glass transition temperature is referred to also as Tg.

The softening temperature is a value which is measured in accordance with the method of JIS K 7196 (1991).

The number average molecular weight and the weight average molecular weight are values measured by gel permeation chromatography using polystyrene as a standard substance. The number average molecular weight is referred to also as Mn, and the weight average molecular weight is referred to also as Mw.

The average molecular weight between crosslinking points is a value which is measured by a dynamic viscoelastic measurement apparatus. The average molecular weight between crosslinking points is referred to also as Mc.

Specifically, the average molecular weight between crosslinking points is calculated by a formula E'min=3ρRT/Mc, from the minimum value (E'min) of the storage elastic modulus E', the density (ρ) of the sample, the gas constant (R) and the absolute temperature (T) of E'min, by measuring the storage elastic modulus E' (unit: Pa) under the following conditions by using a dynamic viscoelasticity measuring apparatus (DMS7100, manufactured by Seiko Instruments Inc.).

(Measurement Conditions)
   Distance between grips: 30 mm
   Heating rate: 2° C./min
   Measurement temperature range: 30° C. to 150° C.
   Frequency: 1 Hz The thicknesses of the respective layers are values measured by using an eddy current film thickness meter. In Examples, "EDY-5000" (product of SANKO ELECTRONIC LABORATORY CO., LTD.) was used as an eddy current film thickness meter.

The thicknesses of the respective layers in a decorative film can be calculated from the ratios of the thicknesses of the respective layers obtainable by observing the cross section of the decorative film with a scanning electron microscope equipped with an energy dispersive X-ray analyzer, and the thickness of the entire decorative film.

The total light transmittance is a value which is measured by the D light source in accordance with JIS K 7361-1: 1997.

The mass of the solid content is, in a case where the composition or the like contains a solvent, a mass having the solvent removed from the composition or the like. Here, with respect to a component constituting the solid content of the composition other than a solvent, it is regarded as a solid content, even if its nature is a liquid. The mass of the solid content of a composition is obtained as a mass remaining after heating 1 g of the composition at 130° C. for 20 minutes.

The decorative film of the present invention (hereinafter referred to also as the present decorative film) is a decorative film having a base film layer and a fluorinated layer containing a crosslinked fluorinated polymer, wherein the crosslinked fluorinated polymer is a crosslinked product of a crosslinkable polymer comprising units based on a fluoroolefin (hereinafter referred to also as units (F)) and units having a crosslinking group (hereinafter referred to also as units (1)), and Mc of the crosslinked fluorinated polymer is from 500 to 50,000.

Hereinafter, the crosslinkable group which the units (1) have, will be referred to also as the first crosslinkable group.

Usually, when the crosslink density of the crosslinked fluorinated polymer is increased, there is a problem that stretchability of the coating film becomes insufficient, while the hardness of the coating film is increased. Further, even in a case where the stretchability of the fluorinated layer is excellent, there is a case where a new problem occurs such that wrinkles occur in the decorative film when it is boded to a three dimensional molded product, while being stretched or being in a stretched state.

To address this problem, the present inventors have found that if Mc of the crosslinked fluorinated polymer in the fluorinated layer is adjusted to be within a predetermined range, the fluorinated layer can be uniformly stretched, while being excellent in stretchability. The reason for this is considered to be such that since Mc of the crosslinked fluorinated polymer is within the predetermined range, a sufficient distance is maintained between the molecular chains of the fluorinated polymer, whereby the influence of the intermolecular force derived from fluorine atoms which the fluorinated polymer has, becomes to be suitable, and the energy generated in the crosslinked fluorinated polymer by stretching is controlled to be in a predetermined direction. As a result, the fluorinated layer has become excellent in stretchability, and the stretchability has become uniform, whereby formation of wrinkles at the time of stretching of the present decorative film is presumed to have been suppressed.

First, the construction of the decorative film of the present invention will be described with reference to the drawings.

FIG. 1 is a schematic side view showing the layer structure of a decorative film 10 which is an embodiment of the present invention. The decorative film 10 has a bonding layer 12, a fluorinated layer 14 and a base film 16, and the respective layers are arranged in this order.

Further, in the example in FIG. 1, the fluorinated layer 14 and the base film 16 are arranged to be in contact. However, in a case where a releasing layer to be described later, is to be provided between the fluorinated layer 14 and the base film 16, the fluorinated layer 14 and the base film 16 may not be in contact.

By press-bonding the bonding layer 12 of the decorative film 10 and the surface to be bonded, of a three dimensional molded product (as described later) under reduced pressure, followed by peeling off the base film 16 from the decorative film 10, it is possible to obtain a decorative film-attached three dimensional molded product, in which the fluorinated layer 14, the bonding layer 12 and the three dimensional molded product are arranged in this order. Thus, the fluorinated layer 14 is located at the outermost surface of the decorative film-attached three dimensional molded product.

The fluorinated layer 14 is excellent in releasability from the base film 16, since it contains a fluorinated polymer to be described later.

Figure 2:
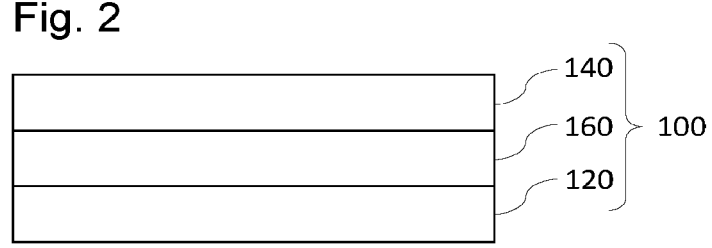
FIG. 2 is a schematic side view showing an example of a layer structure of the decorative film of the present invention.

FIG. 2 is a schematic side view showing the layer structure of a decorative film 100 as another embodiment of the present invention. The decorative film 100 has a bonding layer 120, a base film 160 and a fluorinated layer 140, and the respective layers are arranged in this order.

By press-bonding the bonding layer 120 of the decorative film 100 and the surface to be decorated, of a three dimensional molded product (as described later) under reduced pressure, it is possible to obtain a decorative film-attached three dimensional molded product, in which the fluorinated layer 140, the base film 160, the bonding layer 120 and the three dimensional molded product are arranged in this order. Thus, the fluorinated layer 140 is located at the outermost surface of the decorative film-attached three dimensional molded product.

Although not shown in FIGS. 1 and 2, in order to improve the design property, etc. of the decorative film, the decorative film may have a design layer. The design layer is preferably arranged between the bonding layer and the fluorinated layer.

Specifically, in a case where the decorative film 10 in FIG. 1 has a design layer, a mode in which the bonding layer 12, the design layer, the fluorinated layer 14 and the base film 16 are arranged in this order, may be mentioned.

Further, in a case where the decorative film 100 in FIG. 2 has a design layer, a mode in which the bonding layer 120, the design layer, the base film 160 and the fluorinated layer 140 are arranged in this order, and a mode in which the bonding layer 120, the base film 160, the design layer and the fluorinated layer 140 are arranged in this order, may be mentioned.

Otherwise, the bonding layer, the base film or the fluorinated layer may serve also as a design layer, and in such a case, a design layer may not be provided.

Further, in the examples in FIG. 1 and FIG. 2, although a case where the decorative film 10 has a bonding layer 12, is exemplified, but the mode is not limited to this, and so long as the present decorative film can be bonded to a three dimensional molded product, the present decorative film may not have a bonding layer.

That is, the present decorative film may comprise at least a base film and a fluorinated layer.

The present decorative film preferably has a bonding layer from the viewpoint of adhesion to the three dimensional molded product.

The bonding layer is a layer to bond the present decorative film and the three dimensional molded product, and preferably contains a bonding resin. Specific examples of the bonding resin may be an adhesive resin, a fusible resin, a tacky resin, etc. The bonding layer can be formed, for example, by using a composition containing a bonding resin, or a component which becomes a bonding resin as reacted by heat, etc. The composition containing a component which becomes a bonding resin as reacted by heat, etc. will be referred to also as a composition (a).

As the bonding resin, a thermally fusible resin or a thermally crosslinkable resin is preferred.

In the case of a thermally fusible resin, the thermally softened resin may be cooled and solidified in such a state as being in contact with the surface of the three dimensional molded product, and can be bonded to the surface. In the case of a thermally crosslinkable resin, the resin may be thermally crosslinked in such a state as being in contact with the surface of the three dimensional molded product, and can be bonded to the surface.

Specific examples of the thermally fusible resin may be a partially crosslinked thermally fusible resin having a low softening temperature, and a thermoplastic resin. The bonding layer containing a thermally fusible resin can be formed by using a fusible resin or a composition (a). For example, by using a composition (a) comprising a polyol and a polyisocyanate, it is possible to form a bonding layer containing a thermally fusible polyurethane resin.

The softening temperature of the thermally fusible resin is preferably from 20 to 100° C., particularly preferably from 25 to 90° C., from the viewpoint of blocking resistance and moldability of the present decorative film.

Mw of the thermally fusible resin is preferably from 5,000 to 150,000, particularly preferably from 6,000 to 130,000, from the viewpoint of the film forming property and adhesion.

As the thermally fusible resin, from the viewpoint of excellent adhesion to a three dimensional molded product, a thermally fusible, urethane resin, (meth)acrylic resin, olefin resin, vinyl chloride-vinyl acetate resin, butyral resin, or the like, is preferred.

The bonding resin may be a thermally crosslinkable resin comprising a resin as the main agent and a curing agent. Such a thermally crosslinkable resin may, for example, be a thermally crosslinkable urethane resin comprising a solid polyol or solid hydroxy terminated polyurethane prepolymer, and a solid polyisocyanate or solid blocked polyisocyanate, or an epoxy resin comprising a solid polyepoxide and a solid epoxy resin curing agent.

The composition (a) may contain the above thermally crosslinkable resin, or may contain a component which becomes to be a thermally crosslinkable resin.

The bonding layer may also have a function of a design layer which will be described later. In such a case, by letting a coloring agent be contained in the bonding layer, it is possible to obtain the bonding layer which also has a function as a design layer.

The bonding layer may contain components other than as describe above. Specific examples of components other than as described above may be a ultraviolet absorber, a light stabilizer, a curing catalyst, an antioxidant, a surface modifier, a leveling agent, an anti-sagging agent, a thickener, a defoaming agent, and a conductive filler.

The thickness of the bonding layer is preferably from 0.001 to 0.1 mm, more preferably from 0.004 to 0.08 mm, particularly preferably from 0.01 to 0.06 mm, from the viewpoint of the film forming property and adhesion.

The components which the composition (a) may contain, are the same as the components which the above-described bonding layer may contain. The components which the bonding resin and the bonding layer may contain, may be dissolved or dispersed in the bonding layer-forming agent by a solvent such as water or an organic solvent.

The base film functions as a support film for supporting the respective layers at the time of producing the decorative film.

Specific examples of the material constituting the base film may be a vinyl chloride resin, a polyester resin, an ABS resin (acrylonitrile-butadiene-styrene copolymer), a (meth) acrylic resin, an olefin resin, and a fluorinated polymer other than the fluorinated polymer of the present invention (a fluorinated polymer not containing units based on a monomer having a crosslinkable group; or a polyvinylidene fluoride). Among them, the material constituting the base film layer preferably contains at least one member selected from the group consisting of a vinyl chloride resin, a polyester resin, an ABS resin, a (meth)acrylic resin and a polyvinylidene fluoride.

The thickness of the base film is preferably from 0.01 to 0.5 mm, particularly preferably from 0.02 to 0.3 mm.

The base film may have an uneven pattern on at least one surface. The uneven pattern can be formed by a processing method such as embossing processing, hairline processing, chemical etching processing, etc.

When the base film has an uneven pattern, the uneven pattern is imparted also to the decorative film after peeling the base film, and thus, it is possible to impart a design property attributable to the uneven pattern to the decorative film-attached three dimensional molded product.

The fluorinated layer in the present decorative film contains a crosslinked fluorinated polymer, whereby it is excellent in antifouling properties, durable weather resistance and chemical resistance. Therefore, the decorative film-attached three dimensional molded product having the fluorinated layer has similar effects.

The crosslinked fluorinated polymer contained in the fluorinated layer is a cured product in which a cross-linkable polymer having crosslinkable groups is crosslinked by a curing agent, etc. Hereinafter, the crosslinked fluorinated polymer will be referred to as a fluorinated polymer $F^1$, and a crosslinkable polymer comprising units (F) and units (1) being an uncured product having no crosslinked structure, will be referred to as a fluorinated polymer $F^0$. The crosslinked fluorinated polymer contained in the fluorinated layer may be partially a fluorinated polymer $F^1$, or may be entirely a fluorinated polymer $F^1$.

The fluorinated layer may already form a certain coating film (layer) before being subjected to the production of a decorative film-attached three dimensional molded product. Therefore, it is thereby possible to suppress volatilization of components contained in layers other than the fluorinated layer at the time of bonding the present decorative film and the three dimensional molded product.

The fluorinated layer can be formed, for example, by using a composition containing a fluorinated polymer $F^0$ as described later.

Further, the fluorinated layer may also have a function of a design layer which will be described later. In such a case, by letting a coloring agent be contained in a fluorinated layer, it is possible to obtain the fluorinated layer which also has a function of a design layer.

A fluoroolefin is an olefin in which one or more of hydrogen atoms are substituted by fluorine atoms. In a fluoroolefin, one or more of hydrogen atoms not substituted by fluorine atoms, may be substituted by chlorine atoms.

Specific examples of the fluoroolefin may be $CF_2=CF_2$, $CF_2=CFCl$, $CF_2=CHF$, $CH_2=CF_2$, $CF_2=CFCF_3$, $CF_2=CHCF_3$, $CF_3CH=CHF$, and $CF_3CF=CH_2$. As the fluoroolefin, $CF_2=CF_2$, $CF_2=CFCl$, $CF_3CH=CHF$ and $CF_3CF=CH_2$ are preferred, and from the viewpoint of copolymerizability, $CF_2=CFCl$ is particularly preferred. As the fluoroolefin, two or more types may be used in combination.

The content of units (F) is preferably from 20 to 70 mol %, more preferably from 40 to 60 mol %, particularly preferably from 45 to 55 mol %, to all units which the fluorinated polymer comprises, from the viewpoint of weather resistance of the present decorative film.

Units (1) preferably do not contain fluorine atoms.

Specific examples of the first crosslinking group which units (1) have, may be a hydroxy group, a carboxy group, an amino group, an alkoxysilyl group, an epoxy group, and an oxetanyl group; and from such a viewpoint that the impact resistance, flexibility and chemical resistance of the fluorinated layer will be further improved, a hydroxy group or a carboxy group is preferred, and a hydroxy group is particularly preferred.

Units (1) may be units based on a monomer having a first crosslinkable group (hereinafter referred to also as a monomer (1)) or may be units obtainable by converting crosslinkable groups of a polymer containing units (1) to different crosslinking groups. As such units, units obtainable by reacting a polycarboxylic acid or its acid anhydride (5-norbornene-2,3-dicarboxylic anhydride, citraconic anhydride, maleic anhydride, itaconic anhydride, himic anhydride, etc.) to a polymer containing units having hydroxy groups, to convert some or all of the hydroxy groups to carboxy groups, may be mentioned.

As the monomer (1), two or more types may be used in combination.

Further, the monomer (1) may have two or more types of crosslinkable groups.

As the monomer (1) in which the first crosslinkable group is a carboxy group, an unsaturated carboxylic acid, (meth) acrylic acid, etc. may be mentioned, and a monomer represented by the formula $X^{11}$—$Y^{11}$ (hereinafter referred to also as a monomer (11)) is preferred.

$X^{11}$ is $CH_2=CH$—, $CH(CH_3)=CH$— or $CH_2=C(CH_3)$—, and $CH_2=CH$— or $CH(CH_3)=CH$— is preferred.

$Y^{11}$ is a carboxy group or a $C_{1-12}$ monovalent saturated hydrocarbon group having a carboxy group, and a carboxy group or a $C_{1-10}$ carboxyalkyl group is preferred.

Specific examples of the monomer (11) may be $CH_2=CHCOOH$, $CH(CH_3)=CHCOOH$, $CH_2=C(CH_3)COOH$, and a compound represented by the formula $CH_2=CH(CH_2)_{n1}COOH$ (wherein n1 is an integer of from 1 to 10).

As the monomer (1) in which the first crosslinkable group is a hydroxy group, allyl alcohol, or a vinyl ether, vinyl ester, allyl ether, allyl ester or (meth)acrylic acid ester, having a hydroxy group, may be mentioned, and allyl alcohol or a monomer represented by the formula $X^{12}$—$Y^{12}$ (hereinafter referred to also as a monomer (12)) is preferred.

$X^{12}$ is $CH_2$=CHC(O)O—, $CH_2$=C($CH_3$)C(O)O—, $CH_2$=CHOC(O)—, $CH_2$=CHCH$_2$OC(O)—, $CH_2$=CHO— or $CH_2$=CHCH$_2$O—, and $CH_2$=CHO— or $CH_2$=CHCH$_2$O— is preferred.

$Y^{12}$ is a $C_{2-42}$ monovalentorganic group having a hydroxy group. The organic group may be linear or may be branched. Further, the organic group may consist of a ring structure, or it may contain a ring structure.

As the organic group, a $C_{2-6}$ alkyl group having a hydroxy group, an alkyl group containing a $C_{6-8}$ cycloalkylene group having a hydroxy group, or a polyoxyalkylene group having a hydroxy group, is preferred.

Specific examples of the monomer (12) may be $CH_2$=CHO—$CH_2$-cycloC$_6$H$_{10}$—$CH_2$OH, $CH_2$=CHCH$_2$O—$CH_2$-cycloC$_6$H$_{10}$—$CH_2$OH, $CH_2$=CHOCH$_2$CH$_2$OH, $CH_2$=CHCH$_2$OCH$_2$CH$_2$OH, $CH_2$=CHOCH$_2$CH$_2$CH$_2$OH, $CH_2$=CHCH$_2$OCH$_2$CH$_2$CH$_2$CH$_2$OH, and $CH_2$=CHOCH$_2$-cycloC$_6$H$_{10}$—$CH_2$O(CH$_2$CH$_2$O)$_{15}$H. Here, -cycloC$_6$H$_{10}$— represents a cyclohexylene group, and the binding sites of (-cycloC$_6$H$_{10}$—) are usually 1,4-.

A fluorinated polymer $F^1$ is a crosslinked product which is formed by formation of crosslinking between fluorinated polymers $F^0$, or between a fluorinated polymer $F^0$ and a nonfluorinated compound which will be described later, as crosslinkable groups of units (1) in the fluorinated polymer $F^0$ become to be crosslinking points. Therefore, hardness and flexibility of the fluorinated layer will be improved, and its coating film properties such as weather resistance, water resistance, chemical resistance, heat resistance, stretchability, etc. will be improved.

The content of units (1) is preferably from 0.5 to 35 mol %, more preferably from 3 to 25 mol %, particularly preferably from 5 to 25 mol %, most preferably from 5 to 20 mol %, to all units which the fluorinated polymer $F^0$ comprises. When the content of units (1) is at least 0.5 mol %, the decorative film will be excellent in breaking strength. When the content of units (1) is at most 35 mol %, the decorative film will be excellent in stretchability.

The fluorinated polymer $F^0$ is preferably one which further contains units (hereinafter referred to also as units (2)) based on a monomer having no crosslinkable group (hereinafter referred to also as a monomer (2)) selected from a group consisting of a vinyl ether, a vinyl ester, an allyl ether, an allyl ester and a (meth)acrylic acid ester, and, from such a viewpoint that it will be excellent in copolymerizability with the fluoroolefin, one containing units based on a vinyl ether is particularly preferred.

Units (2) are preferably ones which do not contain fluorine atoms.

Units (2) are preferably units based on a monomer represented by the formula $X^2$—$Y^2$.

$X^2$ is $CH_2$=CHC(O)O—, $CH_2$=C($CH_3$)C(O)O—, $CH_2$=CHOC(O)—, $CH_2$=CHCH$_2$OC(O)—, $CH_2$=CHO— or $CH_2$=CHCH$_2$O—, and, from the viewpoint of excellent weather resistance of the present decorative film, $CH_2$=CHOC(O)—, $CH_2$=CHCH$_2$OC(O)—, $CH_2$=CHO— or $CH_2$=CHCH$_2$O— is preferred, and $CH_2$=CHO— is particularly preferred.

$Y^2$ is a $C_{1-24}$ monovalent hydrocarbon group. The monovalent hydrocarbon group may be linear or branched. Further, the monovalent hydrocarbon group may be made of a ring structure, or it may contain a ring structure. Further, the monovalent hydrocarbon group may be a monovalent saturated hydrocarbon group or a monovalent unsaturated hydrocarbon group.

As the monovalent hydrocarbon group, an alkyl group, a cycloalkyl group, an aryl group, an aralkyl group and a cycloalkylalkyl group are preferred; and a $C_{2-12}$ alkyl group, a $C_{6-10}$ cycloalkyl group, a $C_{6-10}$ aryl group, a $C_{7-12}$ aralkyl group and a $C_{6-10}$ cycloalkylalkyl group are particularly preferred.

Specific examples of the alkyl group may be a methyl group, an ethyl group, a tert-butyl group, a hexyl group, a nonyl group, a decyl group and a dodecyl group.

A specific example of the cycloalkyl group may be a cyclohexyl group.

A specific example of the aralkyl group may be a benzyl group.

A specific example of the cycloalkylalkyl group may be a cyclohexylmethyl group.

Specific examples of the aryl group may be a phenyl group and a naphthyl group.

Here, a hydrogen atom in the cycloalkyl group or a cycloalkyl portion of the cycloalkylalkyl group, the aryl group or the aralkyl group may be substituted by an alkyl group. In such a case, the number of carbon atoms in the alkyl group as a substituent shall not be included in the number of carbon atoms in the cycloalkyl group, the aryl group or the aralkyl group.

As the monomer (2), two or more types may be used in combination.

Specific examples of the monomer (2) may be ethyl vinyl ether, tert-butyl vinyl ether, 2-ethylhexyl vinyl ether, cyclohexyl vinyl ether, vinyl acetate, vinyl pivalate ester, vinyl neononanoate ester (HEXION tradename "VeoVa 9"), vinyl neodecanoate ester (HEXION tradename "VeoVa 10"), vinyl benzoate, tert-butyl benzoic acid vinyl ester, tert-butyl (meth)acrylate, and benzyl (meth)acrylate.

The content of units (2) is preferably from 5 to 60 mol %, particularly preferably from 10 to 50 mol %, to all units which the fluorinated polymer comprises.

The fluorinated polymer $F^0$ preferably comprises units (F), units (1) and units (2) in amounts of from 20 to 70 mol %, from 0.5 to 35 mol % and from 5 to 60 mol % in this order, to all units which the fluorinated polymer has.

Tg of the fluorinated polymer $F^0$ is preferably from 25 to 120° C., more preferably from 30 to 100° C., particularly preferably from 40 to 60° C., from such a viewpoint that the present decorative film will be excellent in abrasion resistance.

Mn of the fluorinated polymer $F^0$ is preferably from 3,000 to 30,000, more preferably from 5,000 to 25,000, particularly preferably from 7,000 to 20,000, from the viewpoint of follow-up properties of the fluorinated layer. Here, in a case where the fluorinated polymer $F^1$ in the fluorinated layer is formed from two or more types of fluorinated polymer $F^0$, Mn of the fluorinated polymer $F^0$ means a weighted mean value having Mn of the respective fluorinated polymers $F^0$ weighted by the contents of the respective fluorinated polymers.

The acid value of the fluorinated polymer $F^0$ is preferably from 1 to 150 mgKOH/g, more preferably from 3 to 100 mgKOH/g, particularly preferably from 5 to 50 mgKOH/g, from the viewpoint of the impact resistance, flexibility and chemical resistance of the present decorative film.

The hydroxy value of the fluorinated polymer $F^0$ is preferably from 1 to 150 mgKOH/g, more preferably from 3 to 100 mgKOH/g, particularly preferably from 10 to 60 mgKOH/g, from the viewpoint of the impact resistance, flexibility and chemical resistance of the present decorative film.

The fluorinated polymer $F^o$ may have only either the acid value or the hydroxy value, or may have both.

When the acid value and the hydroxy value are within the above ranges, Tg of the fluorinated polymer $F^o$ can be suitably adjusted, and the physical properties (impact resistance, flexibility, chemical resistance, etc.) of the present decorative film will be good.

Preferred specific embodiments of the fluorinated polymer $F^o$ in the present invention are as follows.

A fluorinated polymer comprising units (F) made of at least one type of units based on a monomer selected from $CF_2=CFCl$ and $CF_2=CF_2$, units (1) made of at least one type of units based on a monomer having a carboxy group, or a monomer selected from a vinyl ether having a hydroxy group and an allyl ether having a hydroxy group, and units (2) made of at least one type of units based on a monomer selected from a vinyl ether and vinyl ester not having a crosslinkable group.

A fluorinated polymer comprising units (F) based on $CF_2=CFCl$, units (1) made of at least one type of units based on a monomer selected from a vinyl ether having a hydroxy group and an allyl ether having a hydroxy group, and units (2) based on a vinyl ether having no crosslinkable group.

A fluorinated polymer comprising units (F) based on $CF_2=CFCl$, units (1) made of at least one type of units based on a monomer selected from a vinyl ether having a hydroxy group and an allyl ether having a hydroxy group, and units (2) based on a vinyl ether having no crosslinkable group, wherein the contents of the above units to all units which the fluorinated polymer $F^o$ has, are, respectively, from 40 to 60 mol %, from 3 to 30 mol % and from 5 to 60 mol %, in this order.

In the above embodiments, the alternating copolymerization ratio of units (F) and units other than units (F) which the fluorinated polymer $F^o$ contains, tends to be at least 90%, whereby the present decorative film is considered to be excellent in weather resistance. Further, units (1) tend to be uniformly arranged in the fluorinated polymer $F^o$, whereby it is considered that the average molecular weight between crosslinking points in a fluorinated polymer $F^1$ to be formed from the fluorinated polymer $F^o$ can easily uniformly be set, and the present decorative film will be excellent in stretchability. Further, since the average molecular weight between crosslinking points in the fluorinated polymer $F^1$ becomes uniform, it is considered that at the time of stretching the fluorinated layer, the energy in the fluorinated polymer $F^1$ caused by the stretching, can easily be controlled to be in a certain direction, and it is easy to suppress wrinkles at the time of stretching the decorative film.

The fluorinated layer is preferably one containing a fluorinated polymer $F^1$ which is formed from two or more fluorinated polymers $F^o$. The two or more fluorinated polymers $F^o$ are preferably different in Tg.

As the two or more fluorinated polymers $F^o$, a combination of a fluorinated polymer $F^o$ having Tg of less than 50° C. and a fluorinated polymer $F^o$ having Tg of at least 50° C., is preferred, within the above-mentioned preferred range of Tg of the fluorinated polymer $F^o$.

When a fluorinated polymer $F^o$ having Tg of less than 50° C. is used, there is a case where the chemical resistance and hardness of the present decorative film will be not sufficient, while the stretchability and abrasion resistance of the present decorative film become excellent. Whereas, when a fluorinated polymer $F^o$ having Tg of at least 50° C. is used, there is a case where the stretchability and abrasion resistance of the present decorative film will not be sufficient, while the chemical resistance and hardness of the present decorative film will be excellent. Thus, in the present decorative film, the stretchability and abrasion resistance, and the chemical resistance and hardness, are in a trade-off relationship. Therefore, by using two or more fluorinated polymers $F^o$ having different Tg, it is considered possible to provide the stretchability and abrasion resistance, and the chemical resistance and hardness, of the present decorative film, in a balanced state.

In particular, it is considered that when the stretchability and hardness of the present decorative film are balanced, the uniformity of stretchability will be good at the time of stretching the present decorative film, and at the time of bonding the present decorative film to a three dimensional molded product while being stretched or in a stretched state, it is possible to further suppress formation of wrinkles.

From such a viewpoint that the physical properties as described above will be balanced, in the present decorative film, the mass ratio of the fluorinated polymer $F^o$ having Tg of less than 50° C. to the fluorinated polymer $F^o$ having Tg of at least 50° C. (the fluorinated polymer $F^o$ having Tg of less than 50° C./the fluorinated polymer $F^o$ having Tg of at least 50° C.) is preferably from 0.1 to 9, more preferably from 1 to 9, particularly preferably from 2 to 4.

Further, the absolute value of the difference in Tg between the fluorinated polymer $F^o$ having Tg of at least 50° C. and the fluorinated polymer $F^o$ having Tg of less than 50° C. is preferably from 5 to 20° C., particularly preferably from 10 to 15° C.

The content of the fluorinated polymer $F^1$ in the fluorinated layer is preferably from 30 to 100 mass %, particularly preferably from 50 to 95 mass %, to the total mass of the fluorinated layer, from the viewpoint of weather resistance of the present decorative film.

The crosslinked structure of the fluorinated polymer $F^1$ may be a crosslinked structure formed by a curing agent, etc., or may be a crosslinked structure which is directly formed by electron beam crosslinking, etc. As the crosslinked structure, a crosslinked structure formed by a curing agent, is preferred. The crosslinked structure is preferably a crosslinked structure between fluorinated polymers $F^o$, which is formed by the curing agent, or a crosslinked structure between a fluorinated polymer $F^o$ and a non-fluorinated compound as described later, which is formed by the curing agent. The latter crosslinked structure is referred to as co-crosslinking.

The co-crosslinked product of a fluorinated polymer $F^o$ and a non-fluorinated compound as described later, is a fluorinated polymer $F^1$ wherein a fluorinated polymer $F^o$ being a fluorinated polymer having a first crosslinkable group and a non-fluorinated compound having a second crosslinkable group, are co-crosslinked by a curing agent having two or more groups reactive to each of the first crosslinkable group and the second crosslinkable group.

The curing agent is a compound having two or more groups reactive to crosslinkable groups in a molecule. When the curing agent is reacted with crosslinkable groups which a fluorinated polymer $F^o$ comprises, the fluorinated polymer is crosslinked, and the fluorinated polymer $F^o$ is cured. The curing agent usually has from 2 to 30 groups reactive to crosslinkable groups.

The curing agent preferably has groups reactive to each of the first crosslinkable group which the fluorinated polymer $F^o$ has, and the second crosslinkable group which the non-fluorinated compound has. As such groups, groups described above as the first crosslinkable groups which the fluorinated polymer $F^o$ has, may be mentioned.

In a case where the fluorinated polymer $F^o$ and the non-fluorinated compound have hydroxy groups, the curing agent is preferably a compound having two or more isocyanate groups or blocked isocyanate groups in one molecule.

In a case where the fluorinated polymer $F^o$ and the non-fluorinated compound have carboxy groups, the curing agent is preferably a compound having two or more epoxy groups, carbodiimide groups, oxazoline groups or 3-hydroxyalkylamide groups, in one molecule.

In a case where the fluorinated polymer $F^o$ and the non-fluorinated compound have both hydroxy groups and carboxy groups, either one of a compound having two or more isocyanate groups or blocked isocyanate groups in one molecule, and a compound having two or more epoxy groups, carbodiimide groups, oxazoline groups or β-hydroxyalkylamide groups in one molecule, may be used, or both of them may be used in combination.

The compound having two or more isocyanate groups in one molecule is preferably a polyisocyanate monomer or a polyisocyanate derivative.

The polyisocyanate monomer is preferably an alicyclic polyisocyanate, an aliphatic polyisocyanate or an aromatic polyisocyanate. The polyisocyanate derivative is preferably a multimer or modified product (biuret, isocyanurate or adduct) of a polyisocyanate monomer.

Specific examples of the aliphatic polyisocyanate may be aliphatic diisocyanates such as tetramethylene diisocyanate, pentamethylene diisocyanate, hexamethylene diisocyanate, 2,2,4-trimethyl-1,6-diisocyanatohexane and lysine diisocyanate, lysine triisocyanate, 4-isocyanatomethyl-1,8-octamethylene diisocyanate, and bis(2-isocyanatoethyl) 2-isocyanato glutarate.

Specific examples of the alicyclic polyisocyanate may be alicyclic diisocyanates such as isophorone diisocyanate, 1,3-bis(isocyanatomethyl)-cyclohexane, 4,4'-dicyclohexylmethane diisocyanate, norbornene diisocyanate and hydrogenated xylylene diisocyanate.

Specific examples of the aromatic polyisocyanate may be aromatic diisocyanates such as xylylene diisocyanate, etc.

As the curing agent, from such a viewpoint that it is possible to obtain a coating film with elasticity and less formation of cracks, a modified product of a polyisocyanate monomer is preferred; an adduct of a polyisocyanate monomer is more preferred; and an adduct of hexamethylene diisocyanate is particularly preferred.

The compound having two or more blocked isocyanate groups in one molecule is preferably a compound in which two or more isocyanate groups which the polyisocyanate monomer or polyisocyanate derivative as described above has, are blocked by a blocking agent.

The blocking agent is a compound having an active hydrogen, and specific examples may be an alcohol, a phenol, an active methylene, an amine, an imine, an acid amide, a lactam, an oxime, a pyrazole, an imidazole, an imidazoline, a pyrimidine and guanidine.

Specific examples of the compound having two or more epoxy groups in one molecule may be a bisphenol type epoxy compound (A-type, F-type, S-type, etc.), a diphenyl ether type epoxy compound, a hydroquinone-type epoxy compound, a naphthalene type epoxy compound, a biphenyl type epoxy compound, a fluorene type epoxy compound, a hydrogenated bisphenol A type epoxy compound, a bisphenol A-containing nuclear polyol type epoxy compound, a polypropylene glycol type epoxy compound, a glycidyl ester type epoxy compound, a glycidyl amine type epoxy compound, a glyoxal type epoxy compound, an alicyclic type epoxy compound, an alicyclic polyfunctional epoxy compound, and a heterocyclic epoxy compound (triglycidyl isocyanurate, etc.).

Specific examples of the compound having two or more carbodiimide groups in one molecule may be an alicyclic carbodiimide, an aliphatic carbodiimide, and an aromatic carbodiimide, as well as multimers and modified products thereof.

Specific examples of the compound having two or more oxazoline groups in one molecule may be an addition polymerizable oxazoline having a 2-oxazoline group, and a polymer of the addition polymerizable oxazoline.

Specific examples of the compound having two or more β-hydroxyalkylamide groups in one molecule may be N,N,N',N'-tetrakis-(2-hydroxyethyl)adipamide (Prim idXL-552, manufactured by EMS-CHEMIE) and N, N, N', N'-tetrakis-(2-hydroxypropyl)-adipamide (Primid QM 1260, manufactured by EMS-CHEMIE).

The fluorinated layer may contain a curing catalyst. The curing catalyst is a compound that promotes a curing reaction at the time of using a curing agent, and may be selected from known curing catalysts depending on the type of the curing agent.

The fluorinated layer preferably contains a fluorinated polymer F' to which a non-fluorinated compound having a second crosslinkable group is cocrosslinked, from such a viewpoint that the stretchability of the present decorative film will be more excellent. In the fluorinated layer, in addition to the fluorinated polymer $F^1$ being a co-crosslinked product, a crosslinked product of fluorinated polymers $F^o$ one another, or a crosslinked product of non-fluorinated compounds one another, may be contained. However, it is usually difficult to distinguish them in a co-crosslinked product which is formed from a mixture of a fluorinated polymer $F^o$, a non-fluorinated compound having a second crosslinkable group and a curing agent having two or more groups reactive to each of the first crosslinkable group and the second crosslinkable group. In the present invention, this reaction product of the fluorinated polymer $F^o$, the non-fluorinated compound and the curing agent, will be referred to as a co-crosslinked product and will be deemed to be within a category of a fluorinated polymer $F^1$.

The non-fluorinated compound having a second crosslinkable group may be crosslinked alone by electron beam crosslinking, etc., or may be cross-linked by the above-mentioned curing agent, and it may be crosslinked with the fluorinated polymer $F^o$ by the above-mentioned curing agent. The fluorinated layer particularly preferably has a co-crosslinked structure of a non-fluorinated compound having a second crosslinkable group, a fluorinated polymer $F^o$ having a first crosslinkable group and a curing agent. In such a case, in the fluorinated layer, a plurality of molecular chains of the fluorinated polymer $F^o$ are present while maintaining a sufficient distance from one another by non-fluorinated compound chains, whereby the stretchability of the fluorinated layer will be more excellent.

The non-fluorinated compound having a second crosslinkable group is a compound different from the above-described curing agent. The second crosslinkable group is a group reactive to the curing agent in the same manner as said first crosslinkable group. The non-fluorinated compound having a second crosslinkable group preferably has two or more second crosslinkable groups. Specific examples of the second crosslinkable group may be a hydroxy group, a carboxy group, an amino group and an alkoxysilyl group; a hydroxy group and a carboxy group are preferred; and a hydroxy group is particularly preferred.

The non-fluorinated compound having a second crosslinkable group is preferably a non-fluorinated compound having an aliphatic polyether chain, a non-fluorinated compound having an aliphatic polyester chain, a non-fluorinated compound having an aliphatic polyether ester chain, or a non-fluorinated compound having an aliphatic polycarbonate chain. Further, the aliphatic polyether chain, the aliphatic polyester chain, etc. may be a chain having a branch. The number of crosslinkable groups in the non-fluorinated compound is preferably from 2 to 6, more preferably from 2 to 4.

The non-fluorinated compound having an aliphatic polyether chain may, for example, be a polyoxyalkylene polyol, a polyoxyalkylene monool, and their alkyl etherified products. The non-fluorinated compound having an aliphatic polyester chain may, for example, be a polyester diol or polyester dicarboxylic acid composed of an aliphatic dicarboxylic acid residue and aliphatic diol residue, or a polyester diol or polyester dicarboxylic acid composed of an aliphatic hydroxycarboxylic acid residue. The non-fluorinated compound having an aliphatic polyether ester chain may, for example, be a polyether ester diol having an aliphatic polyether diol residue and aliphatic dicarboxylic acid residue. The non-fluorinated compound having an aliphatic polyether chain may, for example, be a polyalkylene carbonate diol having an aliphatic diol residue and a carbonyl group.

The non-fluorinated compound having a branched chain may, for example, be a trivalent or higher-valent polyoxyalkylene polyol obtainable by adding an alkylene oxide to a trivalent or higher-valent alcohol, or a trivalent or higher-valent polyester polyol or polyester polycarboxylic acid, having a trivalent or higher-valent aliphatic polycarboxylic acid residue or a trivalent or higher-valent aliphatic polyol residue, and an aliphatic dicarboxylic acid residue and an aliphatic diol residue.

As the non-fluorinated compound, from the viewpoint of excellent stretchability of the present decorative film, a divalent to tetravalent polyoxypropylene polyol, an aliphatic polyester diol, an aliphatic polyester dicarboxylic acid and an aliphatic polycarbonate diol are more preferred, and a polyoxypropylene triol is particularly preferred.

As the non-fluorinated compound, from such a viewpoint that the above-mentioned functions can better be exhibited, a compound represented by the formula: A-[$(X)_l(Y)_m$—Z]$_n$ (hereinafter referred to also as compound (1)) is preferred.

A represents an n-valent group obtained by removing, from an alcohol having n hydroxy groups, hydrogen atoms of the hydroxy groups.

n is an integer of from 1 to 12, preferably an integer of from 2 to 12, more preferably an integer of from 2 to 10, further preferably an integer of from 2 to 6, particularly preferably from 2 to 4.

As the alcohol having n hydroxy groups, an alcohol having one hydroxy group, and an alcohol having two or more hydroxy groups (hereinafter referred to also as a polyhydric alcohol) may be mentioned. As the alcohol having one hydroxy group, a $C_{1-14}$ alcohol is preferred, and specific examples may be methanol, ethanol, 1-propanol, 2-propanol, 1-butanol, 2-butanol, tert-butyl alcohol, 1-pentanol, 1-hexanol, 1-octanol, isooctyl alcohol, 2-ethylhexanol, 1-nonanol, 2,6-dimethyl-4-heptanol, 1-decanol, 1-undecanol, 1-dodecanol, 1-tridecanol, and 1-tetradecanol.

Specific examples of the polyhydric alcohol may be a dihydric alcohol (ethylene glycol, diethylene glycol, propylene glycol, dipropylene glycol, 1,3-propanediol, 1,3-butanediol, 1,4-butanediol, 2,3-butanediol, 1,5-pentanediol, 3-methyl-1,5-pentanediol, 1,6-hexanediol, 1,4-cyclohexanediol, etc.), and a trihydric or higher polyhydric alcohol (glycerin, diglycerin, trimethylolpropane, ditrimethylolpropane, pentaerythritol, dipentaerythritol, tripentaerythritol, etc.).

l+m in at least one [$(X)_l(Y)_m$—Z] among n number of [$(X)_l(Y)_m$—Z] is an integer of at least 1.

Here, in a case where n is 2 or more, in at least one of [$(X)_l(Y)_m$—Z], l+m is 0 and, Z may be a hydrogen atom. That is, in a case where n is 2 or more, at least one of [$(X)_l(Y)_m$—Z] may be a hydrogen atom, and in such a case, the compound (1) has a hydroxy group which is a part of the residue of a polyhydric alcohol.

X is a divalent group represented by —($C_pH_{2p}O$)—, —(CO—$C_qH_{2q}$O)—, —[CO—$C_qH_{2q}$COO—($C_pH_{2p}$O)$_r$]—, or —(COO—$C_sH_{2s}$—O)—, and, from the viewpoint of excellent stretchability of the present decorative film, a divalent group represented by —($C_pH_{2p}$—O)— is preferred.

—(X)$_l$— represents a polyoxyalkylene chain represented by —($C_pH_{2p}O$)$_l$—, a polyester chain represented by —(CO—$C_qH_{2q}$O)$_l$—, a polyester chain represented by —[CO—$C_qH_{2q}$COO—($C_pH_{2p}$O)$_r$]$_l$— or a polycarbonate chain represented by —(COO—$C_sH_{2s}$—O)$_l$—. However, in a case where l is 2 or more, —(X)$_l$— may be a chain having two or more among divalent groups represented by —($C_pH_{2p}$O)—, —(CO—$C_qH_{2q}$O)—, —(CO—$C_qH_{2q}$COO—$C_pH_{2p}$O)—, and —(COO—$C_sH_{2s}$—O)$_l$.

Here, of —($C_pH_{2p}$O)$_l$—, the bond of the terminal carbon atom is bonded to the A side, and the bond of the terminal oxygen atom is bonded to the Y side. Similarly, of —(CO—$C_qH_{2q}$O)$_l$—, the bond of the terminal carbonyl group is bonded to the A side, and the bond of the terminal oxygen atom is bonded to the Y side. Similarly, of —[CO—$C_qH_{2q}$COO—($C_pH_{2p}$O)$_r$]$_l$—, the bond of the terminal carbonyl group is bonded to the A side, and the bond of the terminal oxygen atom is bonded to the Y side. Similarly, of —(COO—$C_sH_{2s}$—O)$_l$—, the bond of the terminal carbonyl group is bonded to the A side, and the bond of the terminal oxygen atom is bonded to the Y side.

l is an integer of from 0 to 100, and in a case where when n is 2 or more, the respective l in the two or more [$(X)_l(Y)_m$—Z] may be the same or different. In a case where n is 2 or more, each l is preferably 1 or more. From the viewpoint of the mechanism of action of the present invention, each l is preferably from 2 to 75, more preferably from 20 to 70.

In a case where n is 2 or more, the two or more —(X)$_l$— may be the same or different. For example, in a case where —(X)$_l$— is —($C_pH_{2p}$O)$_l$—, there may be a case where the respective l in the respective —(X)$_l$— are different from each other. Further, for example, in a case where —(X)$_l$— is —($C_pH_{2p}$—O)—, the respective p in the respective —(X)$_l$— may sometimes be different from each other.

In a case where X is a group represented by —($C_pH_{2p}$O)—, i.e. an oxyalkylene group, X is a $C_{2-4}$ oxyalkylene group (i.e. p is an integer of from 2 to 4). As the oxyalkylene group, an oxyethylene group, an oxypropylene group, an oxy-1,2-butylene group, an oxy-2,3-butylene group, or an oxytetramethylene group is preferred; an oxyethylene group or an oxypropylene group is more preferred; and an oxypropylene group is particularly preferred (i.e. p is particularly preferably an integer of 2 or 3).

In a case where —(X)$_l$— has two or more oxyalkylene groups, the sequence of different oxyalkylene groups may be a random form or a block form, or may have both of a random form portion and a block form portion.

In a case where X is a group represented by —(CO—$C_qH_{2q}O$)—, X is a group formed by opening of a lactone, or a group formed from a hydroxycarboxylic acid.

q is an integer of from 2 to 8, preferably an integer of from 3 to 6.

Further, with respect to a chain containing two or more types of (CO—$C_qH_{2q}O$) different in q, it is possible to adjust the numerical value for q or to adjust the proportions of (CO—$C_qH_{2q}O$) different in q. The sequence of two or more types of (CO—$C_qH_{2q}O$) different in q may be a random form or a block form.

In a case where X is a group represented by —[CO—$C_qH_{2q}COO$—$(C_pH_{2p}O)_r$]—, X is a group which is formed by polycondensation of a polycarboxylic acid and a polyhydric alcohol.

q is an integer of from 2 to 8, preferably an integer of from 3 to 6. p is, as mentioned above, an integer of from 2 to 4, and an integer of 2 or 3 is preferred. r is an integer of 1 or more, and an integer of from 1 to 100 is preferred.

Specific examples of the polyhydric alcohol constituting X are as described above. Further, as the polyhydric alcohol, a polyalkylene glycol such as polyethylene glycol or polypropylene glycol may also be used.

As specific examples of the polyvalent carboxylic acid constituting X, dicarboxylic acids are preferred, and succinic acid, glutaric acid, adipic acid, pimelic acid, suberic acid, azelaic acid and sebacic acid may be mentioned, and adipic acid is preferred.

Further, with respect to a polyester chain containing two or more types of —[CO—$C_qH_{2q}COO$—$(C_pH_{2p}O)_r$]— different in at least one of p, q and r, it is possible to adjust the numerical values for p, q and r, or to adjust the proportions of —[CO—$C_qH_{2q}COO$—$(C_pH_{2p}O)_r$]— different in at least one of p, q and r. The sequence of two or more types of —[CO—$C_qH_{2q}COO$—$(C_pH_{2p}O)_r$]— different in at least one of p, q and r, may be a random form or a block form.

In a case where X is a group represented by —(COO—$C_sH_{2s}$—O)—, X is a group formed by reacting phosgene, or at least one of a dialkyl carbonate and a diphenyl carbonate, with a polyhydric alcohol, by using a phosgene method, or a carbonate interchange reaction using at least one of the dialkyl carbonate and the diphenyl carbonate.

s is an integer of from 2 to 8, preferably an integer of from 3 to 6.

Specific examples of the polyhydric alcohol constituting X are as described above.

Further, —(X)$_l$— may be a chain containing two or more members selected from the group consisting of —($C_pH_{2p}O$)—, —(CO—$C_qH_{2q}O$)—, —[CO—$C_qH_{2q}COO$—$(C_pH_{2p}O)_r$]— and —(COO—$C_sH_{2s}$—O)—. In such a case, the sequence of —($C_pH_{2p}O$)—, —(CO—$C_qH_{2q}O$)—, —[CO—$C_qH_{2q}COO$—$(C_pH_{2p}O)_r$]— and —(COO—$C_sH_{2s}$—O)— may be a random form or a block form.

Y is a group represented by —(CO—$C_qH_{2q}$—COO)—. Y is a group formed by a polyvalent carboxylic acid, and specific examples of the polyvalent carboxylic acid are as described above. q is, as described above, an integer of from 2 to 8, preferably an integer of from 3 to 6.

m is an integer of 0 or 1.

Z is a hydrogen atom or an alkyl group, preferably a hydrogen atom.

In a case where Z is an alkyl group, the number of carbon atoms is preferably from 1 to 5, more preferably from 1 to 3.

In a case where n is 2 or more, the two or more Z may be the same or different from one another; preferably at least some of them are hydrogen atoms; and more preferably all of them are hydrogen atoms. That is, the compound (1) is preferably a compound having at least one hydroxy group, more preferably a compound having n hydroxy groups.

It is particularly preferred that n is 3 or more, and among three or more Z, three are hydrogen atoms (i.e. a case where the compound (1) has three hydroxy groups), since the stretchability of the fluorinated layer and the uniformity of stretching will be more excellent, and thus, formation of wrinkles at the time of stretching of the present decorative film will be further suppressed.

As the compound (1), it is preferred that in the formula A-[(X)$_l$(Y)$_m$—Z]$_n$, X is at least one member selected from the divalent group represented by —($C_pH_{2p}O$)— and the divalent group represented by —(CO—$C_qH_{2q}O$)—, Z is a hydrogen atom, l is an integer of from 1 to 100, m is 0, and n is an integer of from 2 to 12. When the compound (1) is in this mode, stretchability of the present decorative film will be more excellent.

As the compound (1), further, it is preferred that in the formula A-[(X)$_l$(Y)$_m$—Z]$_n$, X is a divalent group represented by —($C_pH_{2p}O$)—, Z is a hydrogen atom, l is an integer of from 1 to 100, m is 0, and n is an integer of from 2 to 6. When the compound (1) is in this mode, the decorative film will be excellent in stretchability, and will be more excellent in abrasion resistance.

Specific examples of the compound (1) may be Sunnix GP-250, Sunnix GP-400, Sunnix GP-600, Sunnix GP-700, Sunnix GP-1000, Sunnix GP-1500, Sunnix GP-3000, Sunnix GP-3000V, Sunnix GP-3030, Sunnix GP-3700M, Sunnix GP-4000 (all tradenames of Sanyo Chemical Industries, Ltd.), Polycizer W-230-H, Polycizer W-1410-EL (all tradenames of DIC Coporation), and DURANOL T4692 (tradename of Asahi Kasei Corporation).

Mn of the non-fluorinated compound having a second crosslinkable group is preferably from 200 to 30,000, more preferably from 500 to 30,000, further preferably from 500 to 25,000, particularly preferably from 1,500 to 20,000. When Mn of the non-fluorinated compound having a second crosslinkable group is within the above range, it becomes easy to adjust Mc of the present decorative film to be within the predetermined range.

Further, when Mn of the non-fluorinated compound having a second crosslinkable group is within a range of from 200 to 30,000, and Mn of the fluorinated polymer $F^O$ is within a range of from 3,000 to 30,000, it becomes easy to suppress the thermal shrinkage after heating the present decorative film.

The non-fluorinated compound having a second cross-linkable group preferably has the same cross-linkable group as the fluorinated polymer $F^O$. That is, it is preferred that the first crosslinkable group and the second crosslinkable group are the same.

The type of each crosslinkable group is as described above, and it is preferably a hydroxy group. In the case of having a hydroxy group, the hydroxy value of the non-fluorinated compound having a second crosslinkable group is preferably from 10 to 150 mgKOH/g, more preferably from 20 to 130 mgKOH/g, particularly preferably from 30 to 70 mgKOH/g, from the viewpoint of stretchability of the present decorative film.

It is particularly preferred that both the first crosslinkable group and the second crosslinkable group are hydroxy groups, and both of the hydroxy value of the fluorinated polymer $F^O$ and the hydroxy value of the non-fluorinated compound having a second crosslinkable group are from 10 to 150 mgKOH/g. It thereby becomes easy to adjust Mc of the fluorinated layer to be within the range as described below, and formation of wrinkles at the time of stretching of the present decorative film will be further suppressed.

In a case where the fluorinated layer contains a co-crosslinked product of a non-fluorinated compound having a second crosslinkable group, the amount of the non-fluorinated compound in the combination of the non-fluorinated compound and the fluorinated polymer $F^0$ to form the co-crosslinked product, is preferably from 0.1 to 90 parts by mass, more preferably from 0.5 to 30 parts by mass, further preferably from 1 to 25 parts by mass, particularly preferably from 3 to 10 parts by mass, to 100 parts by mass of the fluorinated polymer $F^0$.

The fluorinated layer preferably contains at least one member selected from the group consisting of an ultraviolet absorber and a light stabilizer. As the ultraviolet absorber and light stabilizer, an organic type and inorganic type may be mentioned, and from the viewpoint of compatibility with the fluorinated polymer, an organic type is preferred.

That is, the fluorinated layer may contain both an organic ultraviolet absorber and an organic light stabilizer, or may contain only one of them.

An ultraviolet absorber is a compound that protects the present decorative film from ultraviolet rays.

As the ultraviolet absorber, a salicylate compound, a benzotriazole compound, a benzophenone compound, a cyanoacrylate compound, or a triazine compound (preferably a hydroxyphenyl triazine compound) is preferred.

Specific examples of the organic ultraviolet absorber may be "Tinuvin 326" (molecular weight: 315.8, melting point: 139° C.), "Tinuvin 405" (molecular weight: 583.8, melting point: 74 to 77° C.), "Tinuvin 460" (molecular weight: 629.8, melting point: 93 to 102° C.), "Tinuvin 900" (molecular weight: 447.6, melting point: 137 to 141° C.), "Tinuvin 928" (molecular weight: 441.6, melting point: 109 to 113° C.), manufactured by BASF, "Sanduvor VSU powder" (molecular weight: 312.0, melting point: 123 to 127° C.) manufactured by Clariant, and "Hastavin PR-25 Gran" (molecular weight: 250.0, melting point: 55 to 59° C.) manufactured by Clariant.

As the ultraviolet absorber, two or more types may be used in combination.

In a case where the fluorinated layer contains an ultraviolet absorber, from the viewpoint of the total light transmittance of the fluorinated layer, the content of the ultraviolet absorber is preferably from 0.001 to 10 mass %, particularly preferably from 0.1 to 5 mass %, to the total mass of the fluorinated layer.

A light stabilizer is a compound to improve the light resistance of the present decorative film.

As the light stabilizer, a hindered amine compound is preferred. Specific examples of the hindered amine compound may be "Tinuvin 111 FDL" (molecular weight: 2,000 to 4,000, melting point: 63° C.), "Tinuvin 144" (molecular weight: 685, melting point: 146 to 150° C.), "Tinuvin 152" (molecular weight: 756.6, melting point: 83 to 90° C.), manufactured by BASF, "Sanduvor 3051 powder" (molecular weight: 364.0, melting point: 225° C.) manufactured by Clariant, "Sanduvor 3070 powder" (molecular weight: 1,500, melting point: 148° C.) manufactured by Clariant, and "VP Sanduvor PR-31" (molecular weight: 529, melting point: 120 to 125° C.) manufactured by Clariant.

As the light stabilizer, two or more types may be used in combination.

In a case where the top layer contains a light stabilizer, the content of the light stabilizer is preferably from 0.01 to 15 mass %, particularly preferably from 0.1 to 3 mass %, to the total mass of the fluorinated layer.

The fluorinated layer may contain a fluorinated polymer other than the fluorinated polymer $F^1$, or may contain a resin other than the fluorinated polymer.

A specific example of the fluorinated polymer other than the fluorinated polymer $F^1$ in the present invention may be polyvinylidene fluoride. Specific examples of the resin other than the fluorinated polymer $F^1$ may be an alkyd resin, an amino alkyd resin, an epoxy resin, an urethane resin, a vinyl acetate resin, a (meth)acrylic resin, a vinyl chloride resin, a phenol resin, an acrylic silicone resin, and a silicone resin.

The fluorinated layer may contain, as the case requires, components other than those described above, for example, a filler (an inorganic filler such as silica, an organic filler such as resin beads, etc.), a colorant (a dye, an organic pigment, an inorganic pigment, a glitter pigment using a metal or mica, etc.), a matting agent, a leveling agent, a surface modifier, a degassing agent, a packing agent, a heat stabilizer, a thickener, a dispersing agent, a surfactant, an antistatic agent, a rust inhibitor, a silane coupling agent, an antifouling agent, and a low pollution treatment agent.

Mc of the fluorinated polymer $F^1$ is from 500 to 50,000, more preferably from 1,000 to 28,000, particularly preferably from 1,500 to 20,000. When Mc is within the above range, it is possible to secure a sufficient distance between the molecular chains of the fluorinated polymer $F^1$, whereby stretchability of the fluorinated layer will be excellent.

The ratio of Mn of the fluorinated polymer $F^0$ to Mc of the fluorinated polymer $F^1$ (Mn of the fluorinated polymer $F^0$/Mc of the fluorinated polymer $F^1$) is preferably from 0.01 to 15, more preferably from 0.02 to 13, particularly preferably from 0.10 to 12. When the above ratio is within the above range, formation of wrinkles at the time of stretching of the present decorative film will be further suppressed. The reason for this is considered to be such that the energy in the fluorinated polymer $F^1$ caused by stretching can be better controlled to be in a constant direction.

The thickness of the fluorinated layer is preferably from 1 to 200 μm, particularly preferably from 5 to 100 μm. The present decorative film is, even if it is thin or thick, excellent in moldability. Further, the present decorative film will be uniformly stretched, whereby it is considered that variation in thickness will be small, and difference in the hue such as color unevenness is less likely to occur.

The total light transmittance of the fluorinated layer is preferably at least 70%, more preferably at least 80%, particularly preferably at least 90%, from the viewpoint of the design property of the decorative film-attached three dimensional molded product of the present invention. Here, in the case of using an ultraviolet absorber, it is preferably added so that the total light transmittance of the fluorinated layer is adjusted to be within the above range.

The fluorinated layer is preferably a layer formed by using a composition comprising the fluorinated polymer $F^0$, the non-fluorinated compound having a second crosslinkable group, and a curing agent having two or more groups reactive to each of the first crosslinkable group which the crosslinkable polymer has and the second crosslinkable group which the non-fluorinated compound has. As such a composition, the later-described fluorinated polymer composition may be mentioned.

The present decorative film may have a design layer. The design layer is a layer to impart a design property to a three dimensional molded product.

Specific examples of the design layer may be a layer formed by using a composition for forming a design layer (hereinafter referred to as a composition (d)), a layer formed by using a printing method, and a layer formed by a metal vapor deposition method.

The design layer formed by using the composition (d) is preferably formed by applying the composition (d). Components contained in the composition (d) may be a binder resin (an urethane resin, a (meth)acrylic resin, etc.), a colorant (a dye, an organic pigment, an inorganic pigment, a luster pigment using a metal or mica, etc.), etc. and such components may be dissolved or dispersed in a solvent (water, an organic solvent, etc.).

The layer formed by a printing method is formed by using an ink (including e.g. a binder resin, a colorant and a solvent) suitable for each printing method such as inkjet printing, screen printing, offset printing or flexographic printing.

The layer formed by a metal vapor deposition method is formed by using, for example, a metal such as aluminum, indium, tin or the like.

The design layer may optionally contain components other than the above, specifically, components as mentioned in the composition (a), and components to be mentioned in the fluorinated polymer composition as described below.

The thickness of the design layer is not particularly limited and may be suitably set depending on the application.

The decorative film of the present invention may have a layer other than the above, for example, a release layer or a protective layer.

The release layer is, like in the decorative film 10 in FIG. 1, a layer which may be provided in the case where the base film 16 is finally peeled off. In the embodiment in FIG. 1, the release layer is preferably provided between the base film 16 and the fluorinated layer 14 so as to be in contact with the base film 16. The release layer may be formed, for example, by using a silicone type release agent.

The protective layer is a layer which may be provided for protection of the design layer, and is preferably provided to be in contact with the decorative layer. The protective layer may be formed by using a resin such as a (meth)acrylic resin, a urethane resin, or an ABS resin.

Each layer other than the base film constituting the present decorative film may be formed, for example, by preparing each composition having components to constitute each layer dissolved in a solvent (water, an organic solvent, etc.), and applying it onto a desired layer, followed by drying.

As a specific example of the coating method for forming each layer, a method using a spray, an applicator, a die coater, a bar coater, a roll coater, a comma coater, a roller brush, a brush, or a spatula may be mentioned.

After application of each composition, in order to remove the solvent in the composition, or in a case where each composition contains a curable component, in order to cure said component, it is preferred to heat it. The heating temperature for removing the solvent in the composition is preferably from 0 to 50° C. The heating temperature for curing the composition is preferably from 50 to 150° C. The heating time is usually from 1 minute to 2 weeks.

Here, in a case where the fluorinated polymer composition as described later to be used to form the fluorinated layer, is a so-called powder type containing no solvent, the fluorinated layer may be formed by electrostatic coating or the like. In such a case, the heating temperature for curing the composition is preferably from 100 to 300° C.

Further, the design layer may be formed, as described above, by a method (printing or vapor deposition) other than coating.

Further, the fluorinated layer and the bonding layer may be molded into a film shape in advance, which may be laminated on an arbitrary layer as a laminate.

In order to impart a design property to an object to be decorated (e.g. a three dimensional molded product as described later) or in order to protect the surface of an object to be decorated, the present decorative film is used preferably as stretched, more preferably as stretched by at least 1.2 times. The stretching direction and stretching method may be suitably selected depending on the shape of the three dimensional molded product, or the production conditions at the time of molding. The stretching direction may be any direction, and the stretching method may be any method. That is, stretching of the present decorative film may be carried out by pulling the present decorative film in a predetermined direction or in all directions, or may be carried out by suitably heating and expanding the present decorative film.

The present decorative film is suitably used for decorating a three dimensional molded product to be used as an automobile exterior member or an automobile interior member. Specific examples of the three dimensional molded product for use as an automobile exterior member or an automobile interior member will be described later.

The decorative film-attached three dimensional molded product of the present invention (hereinafter referred to also as the present molded product) is obtainable by press-bonding the present decorative film and the surface to be decorated of the three dimensional molded product under a reduced pressure.

The press bonding method under a reduced pressure in the production method for the present molded product is referred to also as a vacuum forming method (an overlay molding method), and it can be carried out, for example, by using a double-sided vacuum forming device.

Under a reduced pressure is meant for a state in which the pressure is lower than the standard atmospheric pressure. The pressure under a reduced pressure is specifically preferably at most 70 kPa.

In the present molded product, the decorative film may be heated after press-bonding the present decorative film and the surface to be decorated of the three dimensional molded product under reduced pressure, or at the same time as the press-bonding. The heating temperature is preferably from 50 to 150° C.

In the case of using the decorative film 10 as shown in FIG. 1, the present molded product is obtainable by peeling off the base film after the press-bonding under a reduced pressure. In such a case, heating of the present decorative film may be carried out in either timing of before or after peeling of the base film.

Further, the decorative film-attached three dimensional molded product of the present invention may be obtained by a suitable molding method other than the vacuum forming method. Specific examples of such a molding method may be in-mold molding, in-mold transfer molding, in-mold lamination molding, overlay transfer molding, overlay lamination molding, water pressure transfer, etc. Further, to a three dimensional molded product before molding, the decorative film may be press-bonded, followed by processing to obtain a decorative film-attached three dimensional molded product.

Specific examples of the material constituting the three dimensional molded product may be polypropylene, an ABS resin, and polycarbonate.

Specific examples of the three dimensional molded product may be automobile exterior members such as a door mirror, a front under spoiler, a rear under spoiler, a side under skirt, a bumper, a side garnish, etc. and automobile interior members such as a center console, an instrument panel, a door switch panel, etc. The present decorative film may also be suitably used for a liquid crystal surface of a display, a wall material, a labeling billboard, etc.

The fluorinated polymer composition of the present invention (hereinafter referred to as the composition (s)) comprises the fluorinated polymer $F^0$, a non-fluorinated compound having a second crosslinkable group, and a curing agent having two or more groups reactive to each of the first crosslinkable group which the fluorinated polymer has and the second crosslinkable group which the non-fluorinated compound has, wherein Mn of the above fluorinated polymer $F^0$ is from 3,000 to 30,000, and Mn of the above compound is from 500 to 30,000.

The fluorinated polymer $F^0$ which the composition (s) contains is the same as the fluorinated polymer $F^0$ in the above-described fluorinated layer, and its preferred embodiments are also the same, and therefore, the description thereof will be omitted.

The content of the fluorinated polymer in the composition (s) is preferably from 5 to 90 mass %, more preferably from 10 to 80 mass %, particularly preferably from 40 to 80 mass %, to the total solid content mass in the composition (s).

The curing agent which the composition (s) contains, is as described in the above-mentioned fluorinated layer, and its preferred embodiments are also the same, and therefore, the description thereof will be omitted.

In the composition (s), the content of the curing agent is preferably from 10 to 200 parts by mass, particularly preferably from 50 to 150 parts by mass, to 100 parts by mass of the fluorinated polymer in the composition (s).

The non-fluorinated compound having a second crosslinkable group which the composition (s) contains, is as described in the above-mentioned fluorinated layer, and its preferred embodiments are also the same, and therefore, the description thereof will be omitted.

In a case where the composition (s) contains a non-fluorinated compound having a second crosslinkable group, the content of the non-fluorinated compound having a second crosslinkable group is preferably from 0.1 to 90 parts by mass, more preferably from 0.5 to 30 parts by mass, further preferably from 1 to 25 parts by mass, particularly preferably from 3 to 10 parts by mass, to 100 parts by mass of the fluorinated polymer.

It is particularly preferred that in the composition (s) of the present invention, the first crosslinkable group which the fluorinated polymer $F^0$ has, and the second crosslinkable group which the non-fluorinated compound has, are both hydroxy groups, and the hydroxy value of the fluorinated polymer $F^0$ and the hydroxy value of the non-fluorinated compound are both from 10 to 150 mgKOH/g.

Further, the composition (s) may contain at least one member selected from the group consisting of a curing catalyst, an ultraviolet absorber and a light stabilizer, a fluorinated polymer other than the fluorinated polymer in the present invention, a resin other than the fluorinated polymer, and the above-mentioned components which the fluorinated layer may contain, and since the details thereof are the same as described above, description thereof will be omitted.

In a case where the composition (s) contains an ultraviolet absorber, from the viewpoint of the total light transmittance of the fluorinated layer, the content of the ultraviolet absorber is preferably from 0.001 to 10 mass %, particularly preferably from 0.1 to 5 mass %, to the mass of the total solid content in the composition (s).

In a case where the fluorinated polymer composition contains a light stabilizer, the content of the light stabilizer is preferably from 0.01 to 15 mass %, particularly preferably from 0.1 to 3 mass %, to the mass of the total solid content which the composition (s) contains.

From such a viewpoint that it is possible to form a uniform fluorinated layer, the composition (s) preferably contains a solvent (water, an organic solvent or the like) for dissolving or dispersing the respective principal components which the composition (s) contains. As the solvent, an organic solvent is preferred. As the organic solvent, an alcohol, a ketone, an ester, a hydrocarbon or the like is preferred. As the solvent, two or more types may be used in combination.

In a case where the composition (s) contains a solvent, the proportion of solid contents to the total mass of the composition (s) is preferably from 10 to 90 mass %, particularly preferably from 40 to 80 mass %.

Mc of the fluorinated polymer $F^1$ in the fluorinated layer formed from the composition (s) of the present invention is from 500 to 50,000.

The ratio of Mn of the fluorinated polymer $F^0$ to Mc of the fluorinated polymer $F^1$ (Mn/Mc) in the fluorinated layer formed from the composition (s) of the present invention is preferably from 0.01 to 15.

The preferred embodiments of the fluorinated layer formed from the composition (s) of the present invention are the same as of the fluorinated layer in the above-described present decorative film, and therefore, the description thereof will be omitted.

In the decorative film of the present invention, the average molecular weight between crosslinking points in the crosslinked fluorinated polymer is suitably set, whereby wrinkles of the decorative film in the molded product are less likely to be formed even if variation occurs in the stretched state of the decorative film, as in the case where an object to be decorated has a complicated shape, or the object to be decorated is a component having a large area. In particular, in a component having a complicated shape, wrinkles in the film, and in a component having a large area, the difference in surface condition between the edge portion and the central portion, are likely to be problems, but by the decorative film of the present invention, such problems can be solved. Therefore, the decorative film of the present invention can be suitably applied particularly to a vehicle interior member which is likely to have a complicated shape in many cases, or to a vehicle exterior member which is likely to have a large area in many cases.

EXAMPLES

In the following, the present invention will be described in detail with reference to Examples. However, the present invention is not limited to these Examples. In the Table given later, the blend amounts of the respective components are shown based on mass. Further, Ex. 1 to 4 are Examples of the present invention, and Ex. 5 to 7 are Comparative Examples.

<Abbreviations and Details of Components Used>

Polymer 1 solution to Polymer 3 solution: prepared in accordance with Ex. 1 to 3 given later, by using monomers selected from chlorotrifluoroethylene (CTFE), 4-hydroxybutyl vinyl ether (HBVE), cyclohexyl vinyl ether (CHVE), and ethyl vinyl ether (EVE).

Polymer 4 solution: GK-570 (manufactured by DAIKIN INDUSTRIES, LTD., a copolymer of tetrafluoroethylene, vinyl ester and hydroxyalkyl allyl ether, Tg: 35° C.)

Polymer 5 solution: KYNAR761 (manufactured by Arkema, one having polyvinylidene fluoride adjusted to have a polymer concentration of 50 mass % by N-methyl-2-pyrrolidone (Tg: −40° C.)

Polymer 6 solution: one having an acrylic resin having hydroxy groups adjusted to have a polymer concentration of 50 mass % by methyl ethyl ketone (Tg: 25° C.)
(Additives)

Curing agent: E405-70B (compound (adduct) having two or more isocyanate groups in one molecule, manufactured by Asahi Kasei Corporation)

Curing catalyst: ADEKA STAB BT-11 (manufactured by ADEKA Corporation)

Compound (1A): Polyether polyol (poly(oxypropylene-oxyethylene)triol obtained by ring-opening addition polymerization of propylene oxide to glycerin, followed by ring-opening addition polymerization of ethylene oxide; Mn: 3,500, hydroxy value: 45 to 49 mgKOH/g)

Compound (1B): DURANOL T4692 (manufactured by Asahi Kasei Corporation, aliphatic polycarbonate diol; Mn: 2,000, hydroxy value: 51 to 61 mgKOH/g)

Compound 2: acrylic resin having hydroxy groups (Mn: 70,000, hydroxy value: 65 mgKOH/g)

Ultraviolet absorber: TINUVIN 384-2 (manufactured by BASF) Surface conditioner: KF69 (dimethylsilicone oil, manufactured by Shin-Etsu Silicone Co., Ltd.)

Foam inhibitor: Disparlon OX-60 (manufactured by Kusumoto Chemicals, Ltd.)
[Production Example for Polymer 1]

Into an autoclave, xylene (503 g), ethanol (142 g), CTFE (387 g), CHVE (326 g), HBVE (84.9 g), potassium carbonate (12.3 g), and a 50 mass % xylene solution (20 mL) of tert-butyl peroxypivalate, were introduced, and the temperature was raised for polymerization at 65° C. for 11 hours. Subsequently, the solution in the autoclave was filtered to obtain a xylene solution containing polymer 1 as a fluorinated polymer, followed by solvent substitution by butyl acetate, to obtain a butyl acetate solution containing polymer 1 (polymer 1 solution, polymer concentration: 50 mass %). Polymer 1 was a polymer containing units based on CTFE, units based on CHVE and units based on HBVE, at 50 mol %, 39 mol % and 11 mol % in this order, to all units which polymer 1 comprised. The hydroxy value of polymer 1 was 50 mgKOH/g, Tg was 52° C., and Mn was 10,000.
[Production Example for Polymer 2]

A butyl acetate solution containing polymer 2 as a fluorinated polymer (polymer 2 solution, polymer concentration: 50 mass %) was obtained in the same manner except for changing the amounts of monomers to be used.

Polymer 2 was a polymer containing units based on CTFE, units based on CHVE and units based on HBVE, at 50 mol %, 25 mol % and 25 mol %, in this order, to all units which polymer 2 comprised. The hydroxy value of polymer 2 was 118 mgKOH/g, Tg was 45° C., and Mn was 7,000.
[Production Example for Polymer 3]

A butyl acetate solution containing polymer 3 as a fluorinated polymer (polymer 3 solution, polymer concentration: 50 mass %) was obtained in the same manner except for adding EVE as a monomer to be used, and changing the amounts of monomers to be used.

Polymer 3 was a polymer containing units based on CTFE, units based on EVE, units based on CHVE and units based on HBVE, at 50 mol %, 25 mol %, 15 mol % and 10 mol %, in this order, to all units which polymer 3 comprised. The hydroxy value of polymer 3 was 52 mgKOH/g, Tg was 40° C., and Mn was 20,000.

Ex. 1

<Production of Composition (s)>

The respective components shown in the column for "components contained in composition (s)" as described in Ex. 1 of Table 1, were mixed to obtain composition (s1). The details of the added amounts of the respective components are shown in Table 1 below.
<Production of Decorative Film>

On a base film (a polyethylene terephthalate film), composition (s1) was applied by using an applicator, and heated at 80° C. for 5 minutes for drying and curing, to form a fluorinated layer made of a cured coating film having an average thickness of 20 μm.

Then, on the surface of the base film having the fluorinated layer not formed, composition (d1) (TU240 FDSS, manufactured by TOYO INK CO., LTD.) was applied and heated at 80° C. for 5 minutes, to form a design layer made of a coating film having an average thickness of 10 μm.

Then, on the above design layer, composition (a1) (an acrylic adhesive) was applied and heated at 80° C. for 5 minutes, to form a bonding layer made of a coating film having an average thickness of 20 μm.

By the above method, a decorative film (1) was obtained in which the fluorinated layer, the base film, the design layer, and the bonding layer, were arranged in this order.
<Production of Molded Product>

Using a double-sided vacuum forming apparatus, the decorative film (1) and a substrate (a three dimensional molded product, a plate-shaped resin molded product made of a polyolefin resin (TSOP GP6BS, manufactured by Prime Polymer Co., Ltd.) and having a length of 250 mm×a width of 100 mm×a thickness of 3 mm) were, while being press-bonded under reduced pressure, heated at 140° C. for 1 minute by TOM molding (overlay molding), to obtain a molded product (1) being a decorative film-attached three dimensional molded product. The depth of the box-shaped recess of the TOM molding machine was adjusted so that the distance from the set decorative film (1) to the bottom surface of the box-shaped recess became to be 85 mm. Thus, at the time of the TOM molding, the decorative film (1) was stretched by 1.2 times and affixed to the substrate in the stretched state. The obtained molded product (1) was subjected to evaluations as described below.

Ex. 2 to 7

The components of Ex. 2 to 7 in Table 1 were respectively mixed, to obtain compositions (s2) to (s7).

In the same manner as in Ex. 1 except for changing composition (s1) to compositions (s2) to (s7), the decorative films (2) to (7) and molded products (2) to (7) were obtained and subjected to evaluations as described below. The evaluation results are shown in Table 1 below. In Table 1, each numerical value for Mc of polymer described in the column for "Mn of polymer", the column for "Mn of compound", and the column for "Mn/Mc of polymer" is a numerical value of the polymer or compound in the composition used to form the fluorinated layer.

<Evaluation Methods>
[Appearance of Molded Product]

The appearance of a molded product was visually observed and evaluated in accordance with the following standards.

S: No wrinkles are observed at the decorative film portion of the molded product.

A: Wrinkles are observed at the decorative film portion of the molded product, and the portion where wrinkles are formed, is less than 10% of the surface area of the molded product.

B: Wrinkles are observed in the decorative film portion of the molded product, and the portion where wrinkles are formed, is at least 10% and less than 50% of the surface area of the molded product.

C: Wrinkles are observed in the decorative film portion of the molded product, and the portion where wrinkles are formed, is at least 50% of the surface area of the molded product. In addition, occurrence of breakage is observed.

[Shrinkage]

The shrinkage of a decorative film was evaluated by the following method.

The decorative film was cut out in a size of 100 mm×100 mm, put into a baking testing apparatus heated to 80° C. (manufactured by DAIEI KAGAKU SEIKI MFG. Co., Ltd, DK-1M) and heated at 80° C. for one hour, whereupon the heated decorative film was taken out and gradually cooled to 25° C.

The size L0 of the decorative film before heating and the size L1 of the decorative film after heating and cooling were measured, and the shrinkage of the decorative film was obtained in accordance with the following formula. Here, the lower the shrinkage, the less likely the formation of wrinkles in the decorative film after heating.

Shrinkage (%)={$(L0-L1)/L0$}×100

[Maximum Elongation]

The maximum elongation of a decorative film was evaluated by the following method.

Using ORIENTEC TENSILON RTC-1310A (manufactured by ORIENTEC Co., Ltd.), a tensile test was conducted under conditions of a decorative film size of 10 mm×100 mm, a distance of 50 mm between chucks, a tensile speed of 50 mm/min, a temperature of the tension thermostatic bath of 23° C., whereby the maximum elongation of the decorative film in the tensile direction (length after the tensile test/length before the tensile test×100) (%) was measured.

The evaluation results are shown in Table 1. In Ex. 6, no component contributing to crosslinking was present in the top coating film, and therefore, the average molecular weight between crosslinking points was not observed.

TABLE 1

| No. of decorative film and molded product | | | Ex. 1 (1) | Ex. 2 (2) | Ex. 3 (3) | Ex. 4 (4) |
|---|---|---|---|---|---|---|
| Components (g) contained in composition (s) | Polymer solution | 1 | | | 25.0 | |
| | | 2 | 100.0 | | | |
| | | 3 | | 100.0 | 75.0 | |
| | | 4 | | | | 100.0 |
| | | 5 | | | | |
| | | 6 | | | | |
| | Curing agent | | 44.0 | 44.0 | 44.0 | 20.0 |
| | Curing catalyst | | 0.0010 | 0.0010 | 0.0010 | 0.0010 |
| | Compound | 1A | 2.5 | | 2.5 | |
| | | 1B | | 2.5 | | 2.5 |
| | | 2 | | | | |
| | Ultraviolet absorber | | 1.5 | 1.5 | 1.5 | 1.5 |
| | Surface conditioner | | 0.1 | 0.1 | 0.1 | 0.1 |
| | Foam inhibitor | | 0.2 | 0.2 | 0.2 | 0.2 |
| Mn of polymer | | | 7,000 | 20,000 | 17,500 | 12,000 |
| Mn of compound | | | 3,500 | 2,000 | 3,500 | 2,000 |
| Average molecular weight between crosslinking points (Mc) | | | 980 | 1,490 | 17,000 | 34,000 |
| Mn/Mc of polymer | | | 7.14 | 13.42 | 1.03 | 0.35 |
| Evaluation results | Appearance of molded product | | S | S | S | A |
| | Shrinkage (%) | | 0.8 | 1.2 | 3.7 | 1.1 |
| | Maximum elongation (%) | | 130 | 120 | 130 | 130 |

| No. of decorative film and molded product | | | Ex. 5 (5) | Ex. 6 (6) | Ex. 7 (7) |
|---|---|---|---|---|---|
| Components (g) contained in composition (s) | Polymer solution | 1 | | | |
| | | 2 | 100.0 | | |
| | | 3 | | | |
| | | 4 | | | |
| | | 5 | | 100.0 | |
| | | 6 | | | 100.0 |
| | Curing agent | | 20.0 | | 20.0 |
| | Curing catalyst | | 0.0010 | 0.0010 | 0.0010 |
| | Compound | 1A | | | |
| | | 1B | | | 2.5 |
| | | 2 | 10 | | |
| | Ultraviolet absorber | | 1.5 | 1.5 | 1.5 |
| | Surface conditioner | | 0.1 | 0.1 | 0.1 |
| | Foam inhibitor | | 0.2 | 0.2 | 0.2 |
| Mn of polymer | | | 7,000 | 350,000 | 70,000 |
| Mn of compound | | | 70,000 | — | 70,000 |
| Average molecular weight between crosslinking points (Mc) | | | 150,000 | — | 53,000 |

TABLE 1-continued

| | | | | |
|---|---|---|---|---|
| Mn/Mc of polymer | | 0.05 | — | 1.32 |
| Evaluation results | Appearance of molded product | B | C | C |
| | Shrinkage (%) | 5.5 | 0.9 | 5.1 |
| | Maximum elongation (%) | 130 | 110 | 162 |

As shown in Table 1, it has been confirmed that when Mc is within a range of from 500 to 50,000 (Ex. 1 to 4), formation of wrinkles at the decorative film portion of the molded product is less, and the appearance is good.

This application is a continuation of PCT Application No. PCT/JP2018/046992, filed on Dec. 20, 2018, which is based upon and claims the benefit of priority from Japanese Patent Application No. 2017-243772 filed on Dec. 20, 2017. The contents of those applications are incorporated herein by reference in their entireties.

REFERENCE SYMBOLS 10, 100: decorative film
12, 120: adhesive layer
14, 140: fluorinated layer
16, 160: base film layer

What is claimed is:

1. A decorative film comprising:
   a base film layer; and
   a fluorinated layer containing a crosslinked fluorinated polymer,
   wherein
   the crosslinked fluorinated polymer is a co-crosslinked product of a crosslinkable polymer comprising units based on a fluoroolefin and units having a first crosslinkable group, a non-fluorinated compound having a second crosslinkable group, and a curing agent having at least two groups reactive to each of the first crosslinkable group and the second crosslinkable group, and
   wherein
   a number average molecular weight of the crosslinkable polymer is from 3,000 to 30,000,
   a number average molecular weight of the non-fluorinated compound is from 500 to 30,000, and
   the average molecular weight between crosslinking points of the crosslinked fluorinated polymer is from 500 to 50,000.

2. The decorative film according to claim 1, wherein the ratio of the number average molecular weight of the crosslinkable polymer to the average molecular weight between crosslinking points of the crosslinked fluorinated polymer, is from 0.01 to 15.

3. The decorative film according to claim 1, wherein the content of units having a crosslinkable group, to all units which the crosslinkable polymer comprises is from 3 to 30 mol %.

4. The decorative film according to claim 1, further comprising a bonding layer.

5. The decorative film according to claim 4, wherein the decorative film has a structure in which the bonding layer, the fluorinated layer and the base film are arranged in this order, and the fluorinated layer and the base film are in contact.

6. The decorative film according to claim 4, wherein the decorative film has a structure in which the bonding layer, the base film and the fluorinated layer are arranged in this order.

7. An automobile exterior member or an automobile interior member comprising the decorative film according to claim 1.

8. A method for producing the decorative film as defined in claim 1, which comprises forming the fluorinated layer by using a composition comprising
   a crosslinkable polymer comprising units based on a fluoroolefin and units having a first crosslinkable group,
   a non-fluorinated compound having a second crosslinkable group, and
   a curing agent having at least two groups reactive to each of the first crosslinkable group and the second crosslinkable group, characterized in that
   the number average molecular weight of the crosslinkable polymer is from 3,000 to 30,000, and the number average molecular weight of the non-fluorinated compound is from 500 to 30,000.

9. A method for producing a decorative film-attached three dimensional molded product, which comprises press-bonding under reduced pressure the decorative film as defined in claim 1 and a surface to be decorated of a three dimensional molded product, to obtain a decorative film-attached three dimensional molded product having the fluorinated layer at the outermost surface.

\* \* \* \* \*